Feb. 4, 1958 W. M. THOMPSON 2,821,831
ROTARY BRUSH CUTTER
Filed April 4, 1955 3 Sheets-Sheet 2
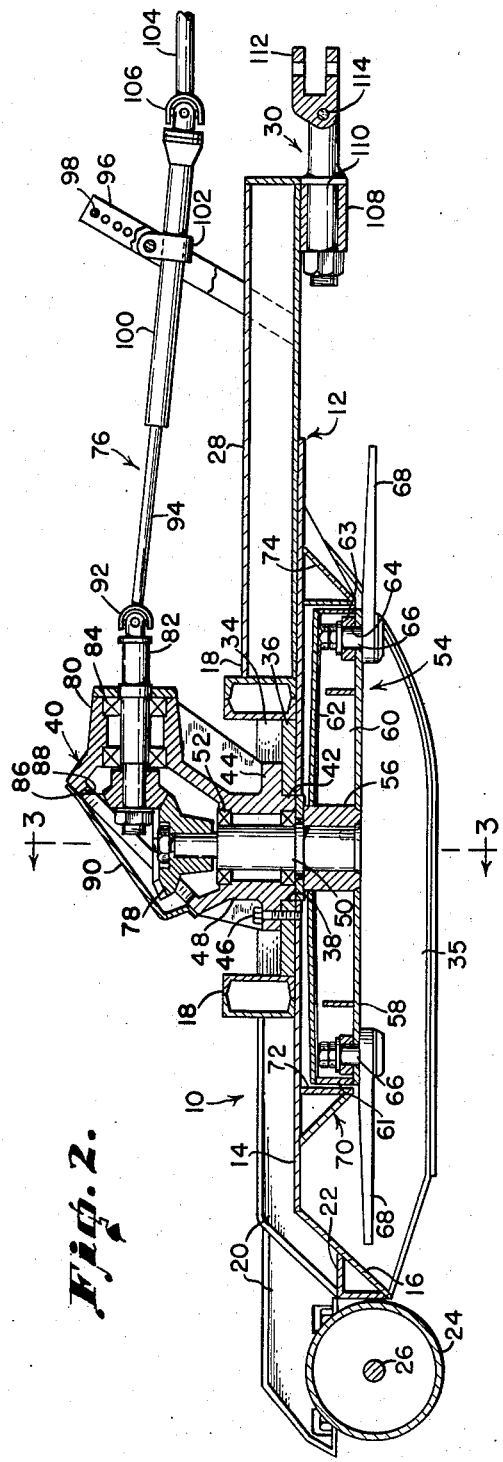
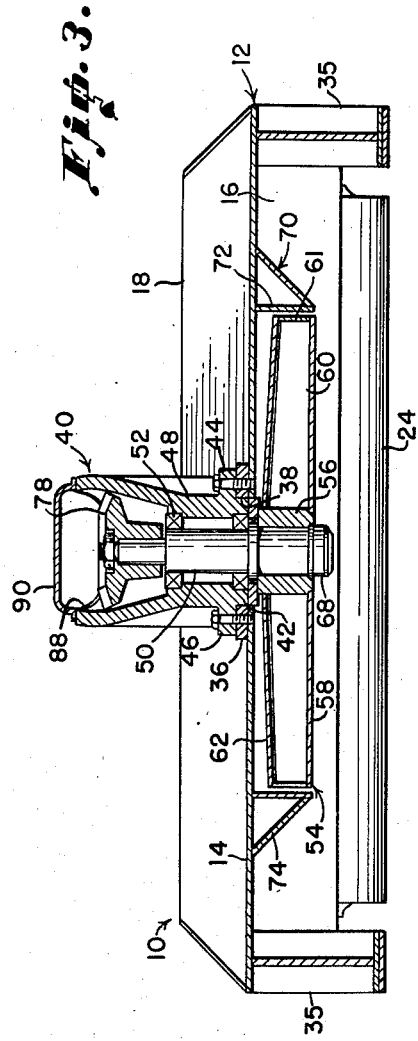
INVENTOR
WALLACE THOMPSON
BY Cushman, Darby & Cushman
ATTORNEYS Feb. 4, 1958 W. M. THOMPSON 2,821,831
ROTARY BRUSH CUTTER
Filed April 4, 1955 3 Sheets-Sheet 3
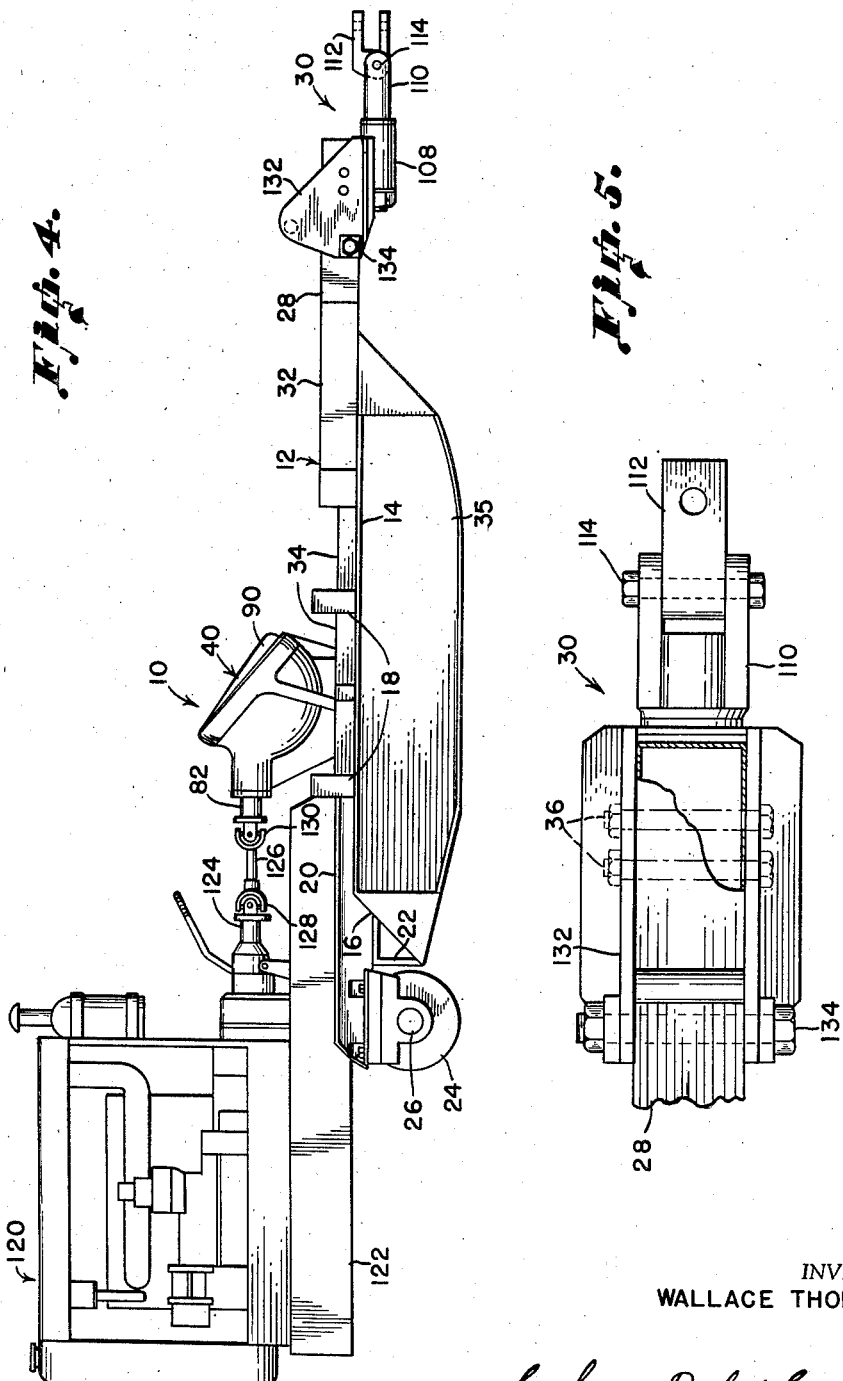
INVENTOR
WALLACE THOMPSON
ATTORNEYS

United States Patent Office 2,821,831
Patented Feb. 4, 1958

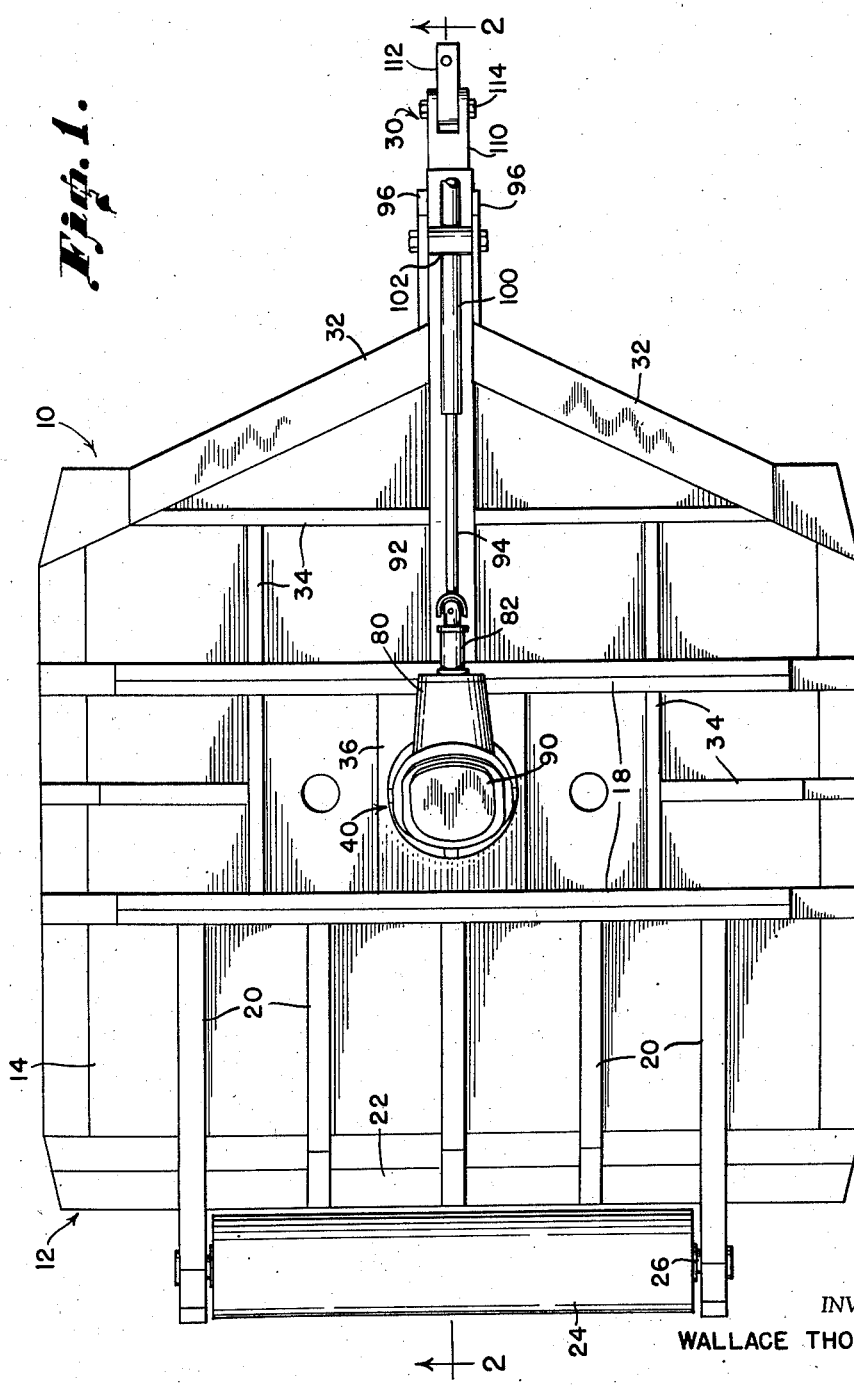

2,821,831
ROTARY BRUSH CUTTER

Wallace M. Thompson, Cordele, Ga., assignor to Harris Foundry & Machine Co., Cordele, Ga., a corporation of Georgia Application April 4, 1955, Serial No. 498,946

1 Claim. (Cl. 55—62)

This invention relates to brush cutters and more particularly to a power-driven brush cutting machine adapted to be drawn by a propelling vehicle, such as a tractor or the like.

An object of the present invention is to provide a power-driven brush cutting machine which is operable to clear brush, including stalks of a substantial diameter.

Another object of the present invention is the provision of a brush cutting machine having an improved blade holding assembly which prevents undue shocks by enabling the machine to ride over thick stumps or the like in the path of the machine.

A further object of the present invention is the provision of a brush cutting machine having an improved hitch construction which enables the machine to be propelled over the ground in a flexible manner so as to insure efficient operation over rough terrain.

A still further object of the present invention is the provision of a rotary brush cutting machine which is sturdy in construction, simple in operation and economical to manufacture.

These and other objects of the present invention will become more apparent during the course of the following detailed description and appended claim.

The invention may best be understood with reference to the accompanying drawings wherein illustrative embodiments are shown.

In the drawings:

Figure 1 is a top plan view of a rotary brush cutting machine illustrating one form of the present invention;

Figure 2 is a cross-sectional view taken along the line 2—2 of Figure 1;

Figure 3 is a cross-sectional view taken along the line 3—3 of Figure 2;

Figure 4 is a side elevational view of a modified form of the present invention; and Figure 5 is an enlarged fragmentary view partially broken away of the hitch device.

Referring now more particularly to Figures 1–3 of the drawings, there is shown a brush cutting machine, generally indicated at 10, which embodies the principles of the present invention. The machine includes a frame construction 12 which comprises a generally rectangular horizontal plate 14 having its rear end inclined downwardly as at 16. Rigidly secured to the upper surface of the plate 14, as by welding or the like, is a pair of longitudinally spaced transverse frame members 18 which are preferably made of a pair of channel beams having the free ends of their legs rigidly secured together, as by welding or the like. Extending rearwardly of the rearward transverse frame member 18 is a plurality of transversely spaced longitudinal frame members 20 which may be of angle beam construction. As shown in Figure 2, the intermediate frame members 20 may be suitably secured to the upper surface of the plate 14, as by welding or the like and have their rear ends inclined downwardly in conformity with the inclined rear end 16 of the plate. A rear transverse member 22 preferably in the form of an angle beam, is suitably secured, as by welding or the like, to the rear edge of the plate 14 and the rear edges of the intermediate frame members 20.

As shown in Figure 1, the outermost frame members 20 may extend horizontally beyond the rear transverse member 22 to receive therebetween a transverse ground engaging roller 24. Roller 24 is rotatable about a horizontal shaft 26, the outer ends of which may be suitably journalled below the rear ends of the outermost frame members 20.

The forward end of the plate 14 has a longitudinally extending reach pole 28, preferably in the form of a hollow rectangular beam, secured to the upper surface thereof, as by welding or the like. The rear end of reach pole 28 abuts the front surface of the forward transverse frame member 18 and is suitably secured thereto and to the upper surface of plate 14, as by welding or the like. The forward end of the reach pole 28 extends beyond the forward edge of the plate 14 and has suitably secured thereto a hitch device 20 hereinafter to be more fully described. The reach pole 28 is braced by a pair of rearwardly diverging diagonal frame members 32 having their forward edges secured to opposite sides of the reach pole and their rearward edges secured to the plate 14. If desired, additional transverse and longitudinal strengthening ribs 34 may be secured to the upper surface of the plate between the diagonal frame members 32 and the transverse frame member 18.

Extending downwardly from each side of plate 14 is a longitudinally extending ground engaging skid or runner 35. As shown, each skid may be constructed of a T-beam having the free end of its vertical flange suitably secured to the lower surface of the plate 14 as by welding or the like. The forward end of each skid is curved upwardly and forwardly and the lower surface of the T-beam may be provided with a wear plate, if desired.

The central portion of the plate 14 has a reinforcing plate 36 secured to the upper surface thereof, as by welding or the like, and a central vertical aperture 38 is formed through the reinforcing plate 36 and plate 14. Mounted on the reinforcing plate 36 is a housing 40 having a depending annular flange 42 adapted to fit within the aperture 38. A radially extending annular flange 44 is formed just above the flange 42 and provides a lower surface arranged to fit on the upper surface of the reinforcing plate 36. The housing 40 may be rigidly secured to the frame by any suitable means, such as bolts 46, extending through flange 44 and into the reinforcing plate 36. The housing 40 further includes a vertically disposed hub portion 48 within which a vertical shaft 50 is suitably journalled, as by bearings 52.

Secured to the lower end of shaft 50 below the plate 14 is a blade holder assembly, generally indicated at 54. In brief, blade holder assembly 54 includes a central hub 56 which may be keyed or otherwise suitably fixed to the lower end of the shaft. A circular plate 58, of considerable thickness, is secured to the lower edge of the hub and has rigidly attached thereto, a plurality of radially extending strengthening ribs 60, preferably in the form of T-beams, having their inner ends welded together and to the periphery of the hub 56 and their outer ends rigidly interconnected by a peripheral plate-like ring 61. A relatively thin cover plate 62 may be secured to the upper surface of the strengthening ribs 60 between peripheral ring 61 and hub 56 so as to prevent the entry of debris. At diametrically opposed positions adjacent the outer periphery of circular plate 58, circular boss elements 63 are rigidly secured to the upper surface of the plate between the outer ends of adjacent ribs 60. An aperture 64 extends vertically through the bosses 62 and the plate 58 so as to receive stub shafts 66. If desired, transverse plates 65 may be secured between the adjacent ribs 60 inwardly of the bosses 62 to provide added strength. The lower end of each stub shaft 66 extends through the inner end of a radially extending cutting blade 68 so as to mount the same below the plate 58 for pivotal movement about a vertical axis.

The blade holding assembly 54 is surrounded by a circular guard ring 70 which is secured to the plate 14 in depending relation thereto. The guard ring 70 includes an inner vertically disposed rim 72 secured, as by welding or the like, to the lower surface of the plate 14 and an outer inclined rim 74 having its lower end rigidly secured to the lower end of the inner rim 72 and its upper end rigidly secured to the plate 14. As shown in Figure 2, the outer rim 74 presents a flat downwardly inclined surface which extends to the lower end of blade holder assembly so as to direct the brush into the path of movement of the blades.

The present invention contemplates the provision of a power means for rotating the shaft 50 and hence, to drive the cutting blades 68. As best shown in Figures 2 and 3, this means may take the form of a transmission, generally indicated at 76, for connecting the shaft 50 to a conventional power take-off of a propelling vehicle as a tractor or the like (not shown). The transmission 76 may include a bevel gear 78 suitably secured to the upper end of the shaft 50 within the housing 40. The housing 40 further includes a horizontally disposed hub portion 80 within which a horizontal shaft 82 is suitably journalled, as by bearings 84. The rear end of the shaft 82 has fixed thereon, a bevel gear 86 arranged to mesh with bevel gear 78. As shown in Figure 2, the upper portion of the housing 40 may be provided with an access opening 88 which is covered by a removable cover plate 90.

The forward end of shaft 82 has one end of a universal joint 92 connected therewith, the other end of which is connected with a shaft 94. Shaft 94 is adjustably supported from the reach pole 28 by means of a pair of upstanding straps 96 having their lower ends rigidly secured to opposite sides of the reach pole and their upper ends provided with a series of vertically spaced apertures 98. A sleeve 100 surrounds the forward end of the shaft 94 and has a clamp 102 embracing the same which is selectively mounted between straps 96 in aligned holes 98 thereof. It will be seen that by mounting the clamp 102 in different vertically spaced holes 98, the end of the shaft 94 may be positioned in different vertical locations so as to accommodate the power take-off shafts of different propelled vehicles. As shown in Figure 2, the forward end of the shaft 94 is preferably connected to the power take-off by an auxiliary shaft 104 having its rear end connected to the forward end of the shaft 94 by a universal joint 106.

The hitch device 30 comprises a tubular bearing 108 rigidly secured, as by welding or the like, to the lower surface of the outer end of the reach pole 28. A bar 110 has its rear end journalled within the tubular bearing 108 for rotation about a horizontal longitudinal axis and its forward end bifurcated to receive a clevis 112. As shown in Figures 1 and 2, clevis 112 is connected to the bar 110 at its rear end by means of a horizontally disposed transverse pivot pin 114 and the forward end thereof may be bifuracted to receive the draw bar of the tractor and apertured to receive a suitable connecting pin.

Referring now to Figures 4 and 5, there is shown a brush cutting machine having a modified form of cutter driving means and a somewhat modified hitch device. More specifically, the machine illustrated in Figure 4 is provided with a suitable prime mover 120 which may be in the form of a diesel engine or other internal combustion engine. The prime mover 120 is preferably mounted on the rear end of the main frame by means of a suitable platform 122 rigidly secured to the main frame in cantilever fashion. The prime mover 120 includes the usual drive shaft 124 which is connected to the vertical shaft 50 by means incorporating the previously described portion of the transmission 76 carried within housing 40. Preferably, the housing 40 is disposed so that the shaft 82 will extend rearwardly and the latter may be connected with the drive shaft 124 by an auxiliary shaft 126 having universal connections 128 and 130 at the respective ends thereof.

The modified hitch construction includes all of the elements described in connection with the embodiment of Figures 1-3, however, the depending bearing 108 is mounted on the bight portion of a U-shaped element 132. The rear end of the legs of the element 132 are pivotally secured in embracing relation to the reach pole 28 by means of a horizontal pivot pin 134 extending through the legs and the reach pole. In normal operation, the bight portion or element 132 will be in engagement with the lower surface of the reach pole, however, where particularly rough terrain is encountered, the pivotal connection of the element 132 enables the machine to have a greater degree of flexibility so as to insure maximum traction of the propelling vehicle at all times. If desired, bolts 136, shown in phantom in Figure 5, may be secured between the forward end of the legs of the element 152 and the reach pole to rigidly secure the element where the added flexibility is not needed.

In operation, the brush cutting machine of the present invention is arranged to be drawn by a suitable propelling vehicle, such as a tractor or the like, and functions to cut stalks of considerable diameter. In addition to stalk cutting operations, the machine is valuable in cutting pasture, clearing up new ground, cleaning vacant lots and park areas, as well as highway, right-of-way, airport, and golf course maintenance. The hitch device 30 is adapted to connect the machine to the conventional draw bar of a tractor but it will be appreciated that suitable draft connections may be provided in lieu thereof to connect the machine to tractors having three-point lift type hitches. The hitch device 30 flexibly suspends the front end of the machine to the tractor with the rear end thereof being supported for movement over the ground by the longitudinal skids 35 and the rear transverse roller 24 which serves to embed rocks, stubble and the like into the ground as the machine passes thereover. It will be seen that as the machine is drawn over the ground, it can closely follow the surface contour thereof since the hitch device 30 provides pivotal movement not only about transverse vertical and horizontal axes, but a longitudinal horizontal axis as well. The modified hitch device of Figures 4 and 5 is preferred where rough terrain is encountered since the additional transverse horizontal pivot of element 132 provides added flexibility.

The frame construction of the present machine is particularly sturdy and will withstand the rugged conditions to which the machine is subjected over an extended period of use. Another salient feature of the present invention is the sturdy, balanced construction of the blade holder assembly 54 and the manner in which it cooperates with the guard ring 70. The outer rim 74 of the guard ring presents a flat downwardly inclined surface which serves to direct short stalks downwardly so as to be cut by the blades 68. The lower circular plate 58 of the blade holder assembly presents a smooth continuous flat surface which eliminates the danger of shocks thereto since there are no projecting parts to strike a rock, thick stalk or the like.

The housing 40 and its contained gears provide the present machine with a convenient means whereby the cutter may be driven optionally either from the conventional power take-off of a tractor or an integrally mounted prime mover. As the blade holder assembly is driven, the blades 68 will extend radially outwardly due to the centrifugal force. Since the blades are mounted on the holder assembly for pivotal movement about a vertical axis, they are free to pivot rearward upon striking an unyielding obstacle, thus eliminating the need for complicated overload release devices.

It is to be understood that the forms of the invention herewith shown and described are to be taken as the preferred embodiment of the same and that various changes may be made without departing from the spirit of the invention or the scope of the appended claim.

I claim:

A brush cutting machine comprising a horizontal frame, a longitudinal ground engaging skid extending downwardly from each side of said frame, a ground engaging roller mounted on the rear end portion of said frame, a vertical shaft journalled in the central portion of said frame, a circular blade holder rigidly secured to the lower end of said shaft, said blade holder including a substantially flat circular plate spaced below said frame, a central hub rigidly secured at its lower end to said circular plate, a plurality of radial ribs secured to the upper surface of said plate and having their inner ends secured together and to said hub, a plate-like ring extending upwardly from the peripheral edge of said plate and being secured to the outer ends of said radial ribs, and a cover plate secured to said plate-like ring, ribs and central hub, a guard ring secured to said frame in surrounding relation to said blade holder and having an annular rim extending upwardly and outwardly from the periphery of said plate to said frame, a plurality of circumferentially spaced blades secured below said circular plate for pivotal movement about vertical axes, hitch means on the forward end of said frame for connecting the same to a propelling vehicle, and means for rotating said shaft to drive said blades.

References Cited in the file of this patent

UNITED STATES PATENTS

| | | |
|---|---|---|
| 2,476,394 | Webb et al. | July 19, 1949 |
| 2,476,526 | Badlat | July 19, 1949 |
| 2,621,457 | Rosenberg | Dec. 16, 1952 |
| 2,675,662 | Kroll | Apr. 20, 1954 |